United States Patent
Her et al.

(10) Patent No.: US 11,219,969 B2
(45) Date of Patent: Jan. 11, 2022

(54) METHOD FOR THE EDGE-TO-EDGE ASSEMBLY OF TWO PANELS USING FRICTION STIR WELDING

(71) Applicant: Airbus Operations SAS, Toulouse (FR)

(72) Inventors: Alain Her, Saint Herbliin (FR); Raphaël Hardy, Orvault (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 61 days.

(21) Appl. No.: 16/774,877

(22) Filed: Jan. 28, 2020

(65) Prior Publication Data

US 2020/0238439 A1    Jul. 30, 2020

(30) Foreign Application Priority Data

Jan. 29, 2019   (FR) ...................................... 1900797

(51) Int. Cl.
   *B23K 20/12*     (2006.01)
   *B23K 20/26*     (2006.01)
   *B23K 26/146*    (2014.01)

(52) U.S. Cl.
   CPC ........ *B23K 26/146* (2015.10); *B23K 20/1265* (2013.01)

(58) Field of Classification Search
   None
   See application file for complete search history.

(56) References Cited

U.S. PATENT DOCUMENTS

| | | | | |
|---|---|---|---|---|
| 2,363,828 | A * | 11/1944 | Anderson | B23K 33/00 228/164 |
| 3,301,994 | A * | 1/1967 | Seeloff | B23K 37/08 219/78.14 |
| 4,635,841 | A * | 1/1987 | Frei | B23K 26/244 228/147 |
| 6,579,626 | B1 * | 6/2003 | Ottinger | B23K 11/02 428/626 |
| 8,434,661 | B2 * | 5/2013 | Hovanski | B23K 20/1255 228/112.1 |
| 2003/0192941 | A1 | 10/2003 | Ishida et al. | |

(Continued)

FOREIGN PATENT DOCUMENTS

| | | |
|---|---|---|
| DE | 2949095 B1 | 3/1981 |
| DE | 102014003533 A1 | 9/2015 |

(Continued)

OTHER PUBLICATIONS

French Search Report; priority document.

*Primary Examiner* — Devang R Patel
(74) *Attorney, Agent, or Firm* — Greer, Burns & Crain, Ltd.

(57) ABSTRACT

A method for edge-to-edge welding of a first sheet metal panel to a second sheet metal panel on a bearing structure. The method comprises positioning and fixing the first panel to the bearing structure, positioning and fixing the second panel to the bearing structure with the second panel overlapping a raw edge of the first panel, jointly cutting the first panel and the second panel in the overlap area to form a connection edge of the first panel and a connection edge of the second panel, withdrawing scrap cuttings from the first panel and scrap cuttings from the second panel, and friction stir welding the connection edges.

8 Claims, 5 Drawing Sheets

(56) References Cited

U.S. PATENT DOCUMENTS

| | | | |
|---|---|---|---|
| 2004/0197159 A1* | 10/2004 | Ishida | B23Q 11/08 |
| | | | 409/134 |
| 2006/0191979 A1* | 8/2006 | Lohwasser | B25B 11/005 |
| | | | 228/112.1 |
| 2009/0283509 A1 | 11/2009 | Frauen et al. | |
| 2011/0104515 A1* | 5/2011 | Kou | C22C 23/02 |
| | | | 428/649 |
| 2015/0083860 A1 | 3/2015 | Frauen et al. | |
| 2017/0304933 A1* | 10/2017 | Miles | B23K 9/042 |

FOREIGN PATENT DOCUMENTS

| | | |
|---|---|---|
| EP | 2853495 A1 | 4/2015 |
| FR | 2976834 A1 | 12/2012 |

* cited by examiner

METHOD FOR THE EDGE-TO-EDGE ASSEMBLY OF TWO PANELS USING FRICTION STIR WELDING

CROSS-REFERENCES TO RELATED APPLICATIONS

This application claims the benefit of the French patent application No. 1900797 filed on Jan. 29, 2019, the entire disclosures of which are incorporated herein by way of reference.

FIELD OF THE INVENTION

The invention relates to the assembly of metal panels welded edge-to-edge in order to form, together, a substantially cylindrical revolution shape defining the skin of an aircraft fuselage.

BACKGROUND OF THE INVENTION

As represented in FIG. 1, an aircraft fuselage 1 includes frames 2, i.e., annular structural elements spaced apart from one another along a longitudinal axis AX, and which bear substantially rectangular panels 3-6, made from aluminum or the like forming the skin of this fuselage 1. Non-represented stiffeners extend longitudinally, each linking two consecutive frames to one another.

Each panel has two opposite edges fixed to two frames and the other two opposite edges thereof fixed to two stiffeners or longerons, such that the various panels are located edge-to-edge in order to form the skin of the fuselage.

In this context, it is envisaged to connect these panels edge-to-edge by producing a friction stir welding seam. Friction stir welding makes it possible to produce an edge-to-edge weld by limiting the rise in temperature, such that the mechanical strength of the assembly is not reduced at the welding seam. Conversely, the other methods of welding cause a significant temperature increase when forming the welding seam, which makes the material brittle at the seam.

In practice, friction stir welding uses a rotating pin having a shoulder at the base thereof, and this rotating pin is introduced at the junction of the panels positioned edge-to-edge. This introduction is made possible by a local softening of the matter resulting from the heating generated by the friction of the pin against the material of the panels. The pasty state of the matter around the pin then makes it possible to move the pin along the junction, and the rotation thereof stirs the pasty matter forming a welding seam without addition of matter.

Implementing friction stir welding is nevertheless restrictive since it requires the edges to be welded to be contiguous or spaced apart from one another by an extremely small maximum clearance, between 10% and 15% of the thickness of the panels, given that the seam is formed without addition of matter. The maximum clearance is typically of the order of one to a few tenths of a millimeter.

In practice, the edges to be connected are firstly premachined on the first panel and on the second panel, before placing these panels on a bearing structure with the raw edges of the panels facing one another and locking these panels on this structure. When these panels have large dimensions, the locking thereof on the structure deforms them geometrically, such that the edges thereof move away from one another, to the extent that the maximum permissible clearance is no longer observed over the entire length.

A milling run is therefore carried out between the two raw edges with a mill, the diameter of which is necessarily greater than the maximum permissible clearance, in order to form the two connection edges. One of the panels is then brought closer to the other on the structure in order to position the connection edges against one another over the entire length, such that the friction stir formation of the seam can then be implemented.

The apparatus making it possible to mill the raw edges in place in order to form the connection edges, then to move one of the panels in order to bring the connection edges back against one another requires mechanical equipment driven by a complex control system, sold under the brand name MUVAX.

In practice, such a solution furthermore involves a large number of handling, positioning and clamping operations, which makes the implementation thereof particularly long and costly.

In any event, the edge-to-edge assembly of panels having large dimensions using a friction stir welding method involves a large number of operations in order to obtain satisfactory geometric compliance of the two connection edges to be welded.

An object of the invention is to provide a solution to facilitate the edge-to-edge assembly of two panels using a friction stir welding method.

SUMMARY OF THE INVENTION

To this end, the subject matter of the invention is a method for edge-to-edge welding of a first sheet metal panel to a second sheet metal panel, this method comprising:
  a step of positioning the first panel;
  a step of positioning the second panel with the second panel overlapping a raw edge of the first panel;
  a step of jointly cutting the first panel and the second panel in the overlap area in order to form a connection edge of the first panel and a connection edge of the second panel;
  a step of friction stir welding the connection edges in order to edge-to-edge weld the first panel to the second panel.

With this solution, it is not necessary to reposition the panels edge-to-edge in order to be able to carry out the friction stir welding step: once the cutting operation has been produced, the connection edges of the panels are properly positioned with respect to one another.

The invention also relates to a method as defined, wherein the first panel is positioned by being fixed to a bearing structure, and wherein the second panel is positioned by being fixed to this bearing structure.

The invention also relates to a method as defined, wherein the first panel is positioned on a mounting of an apparatus and wherein the second panel is positioned with respect to the first panel by being borne by a handling unit.

The invention also relates to a method as defined, wherein the cutting step is implemented using a laser cutting method.

The invention also relates to a method as defined, wherein the cutting step is implemented using a laser water jet cutting method.

The invention also relates to a method as defined, wherein the cutting step produces a cut having a width less than three tenths of a millimeter.

The invention also relates to a method as defined, wherein a reflective chute is fitted under the overlapping area of the panels in order to form a protection during the laser cutting step.

The invention also relates to a method as defined, wherein the chute is dimensioned to collect scrap cuttings from the first panel at the end of the cutting operation.

The invention also relates to a method as defined, wherein the bearing structure includes frames, each comprising a notch receiving the chute.

The invention also relates to a method as defined, wherein the panels are incurved and wherein the frames bearing these panels are curved.

DETAILED DESCRIPTION OF THE PREFERRED EMBODIMENTS

The idea forming the basis of the invention is to place the edges of the panels to be welded in an overlapping configuration, then to perform fine and precise cutting of the two superposed edges, in order to directly define two connection edges positioned at the required distance from one another, such that the panels do not need to be repositioned in order to produce friction stir welding.

Figure 1:
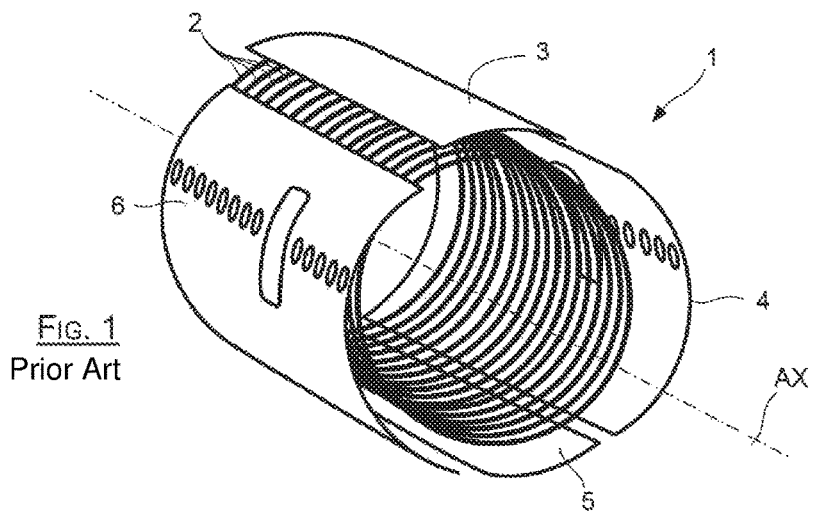
FIG. 1, which has already been described, is an exploded overview of a known fuselage.
Figure 2:
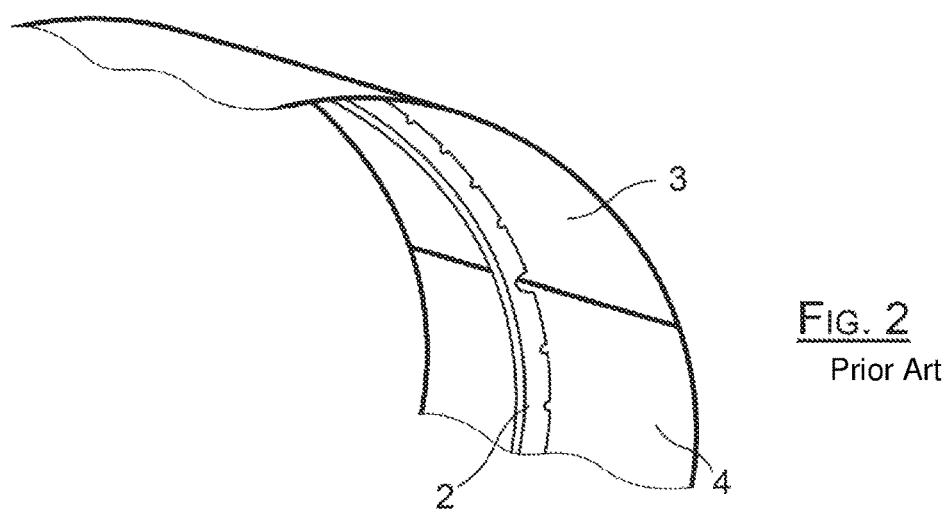
FIG. 2, which has already been described, is a detail view of two panels borne by a frame.
Figure 3:
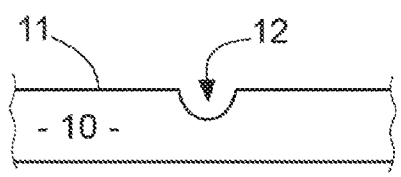
FIG. 3 is a schematic view of a structure intended to receive two panels in order to weld them edge-to-edge according to a first embodiment of the invention.

In FIG. 3, a frame portion 10 includes an external face 11 intended to bear two panels and provided with a notch 12 having the shape of the letter C open towards the external face 11, and the position of which corresponds to the connection of the panels that are to be borne by this frame.

Figure 4:
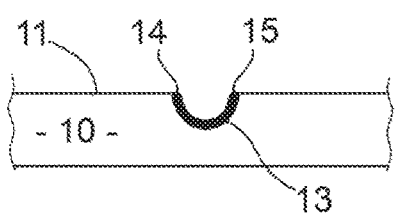
FIG. 4 is a schematic view of a structure intended to receive panels which is provided with a reflective chute according to the first embodiment of the invention.

This notch 12 then receives a reflective chute 13, as illustrated in FIG. 4, in this case having a semi-cylindrical shape, the section of which corresponds to that of the notch 12, such that this chute defines two borders 14 and 15 located flush with the external face 11 of the frame 10.

In practice, a series of frames like the frame 10 are placed one behind the other along a longitudinal axis of the fuselage, in order to bear all of the panels jointly forming the skin of the fuselage. These frames all have a notch at the same position as the notch 12, such as to form a series of notches aligned along the longitudinal axis. The reflective chute 13 is fitted in the notches of several consecutive frames, in order to extend over a length greater than or equal to that of the panels to be fitted and to be connected. These notches are dimensioned in order to be able to insert and remove the chute.

Figure 5:
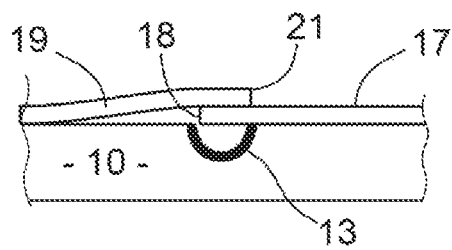
FIG. 5 is a schematic view of a structure bearing two panels partially overlapping one another and fixed to the structure according to the first embodiment of the invention.
Figure 6:
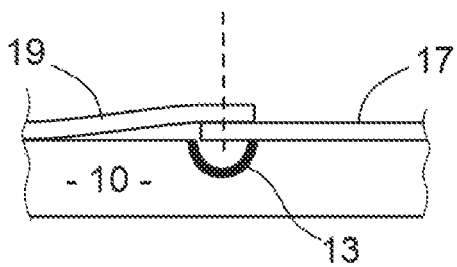
FIG. 6 is a schematic view of a structure bearing two panels at the stage of cutting the connection edges according to the first embodiment of the invention.

As represented in FIG. 5, a lower panel 17 is then fitted on the frames, with the edge 18 thereof at the reflective chute 13, being directly supported on the frames, and fixed thereto. The panel 17 is more particularly positioned such that it has a raw edge 18 located between the borders 14 and 15 of the chute 13.

An upper panel 19 is then fitted, such as to overlap the edge 18 of the lower panel 17. In the example of the figures, the raw edge 21 of the upper panel 19 is located substantially in line with the border 15 of the chute 13, such that the overlap area of the lower panel 17 is slightly less than the width of the chute, i.e., than the distance separating the borders 14 and 15.

The upper panel 19 is fixed to the frames and substantially moves away therefrom in proximity to the chute 13 given the thickness of the lower panel 17 that it locally overlaps. More specifically, the panel is fixed to the frames at a distance that is sufficiently far from the edge of this panel in order to give this panel the necessary flexibility such that it is supported on the other panel, while giving it a sufficient return force.

Once the assembly is in place, as in FIG. 5, the two overlapping panels are precisely cut, along the reflective chute 13 in order to form two connection edges 22, 23 precisely positioned at an extremely small distance from one another. The return force of the first panel allows it, after cutting, to be naturally pressed entirely against the frame in order to position the edge thereof to face the edge of the second panel.

Cutting is produced using a laser method, dimensioned to cut the two superposed panels 17 and 19, with a cutting width less than the maximum permissible clearance, in order to then implement a friction stir welding operation without having to reposition these connection edges.

Advantageously, this cutting is carried out using a laser water jet method, like that proposed under the brand name Synova, which makes it possible to produce extremely fine cuts, i.e., having a width of between 20 and 150 microns.

Such a hybrid method generates a low-pressure water jet which carries a laser beam guided by this jet as it would be by an optical fiber, this laser beam being reflected on the external face of the water jet, i.e., at the interface of the jet and of air. The laser beam is in this case entirely contained within the water jet without being able to be deflected, which makes it possible to achieve high cutting precision while limiting the rise in temperature, due to the water jet which continually cools the cutting area.

Due to the reflective chute 13 previously fitted, the laser cutting operation is limited to the cutting of the two thicknesses of panels, and does not risk interfering with elements located on the inner side of the fuselage, such as, in particular, the frames bearing the panels.

Once the cutting operation has been carried out, the scrap from the upper panel which is a strip of sheet metal with a width corresponding substantially to half of the width of the chute 13 is removed. The scrap from the lower panel 17 is a sheet metal strip with a width less than half the width of the chute, and it has fallen into this chute under the effect of gravity. This other scrap is then removed by being pulled along the chute.

Figure 7:
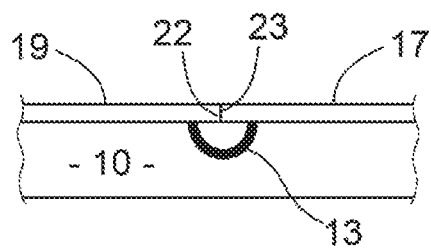
FIG. 7 is a schematic view of a structure bearing two panels positioned edge-to-edge with precision according to the first embodiment of the invention.

At this stage, and as represented in FIG. 7, the two connection edges 22 and 23 are located facing one another and separated from one another by an extremely small distance corresponding to the cutting width, and which is less than the maximum permissible clearance.

Figure 8:
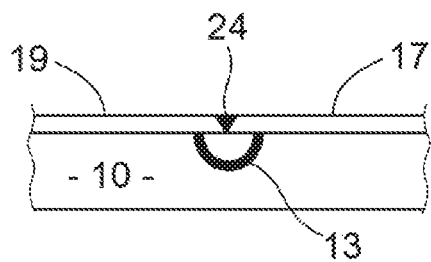
FIG. 8 is a schematic view of a structure bearing two panels positioned edge-to-edge and in the process of friction stir welding according to the first embodiment of the invention.

The friction stir welding operation can then be implemented in order to weld the two connection edges 22 and 23 to one another, the obtained welding joint being marked with 24 in FIG. 8. Prior to the friction stir operation per se, the fixing of the upper panel 19 to the frames can be completed in order to optimally hold the upper panel during the friction stir operation.

Figure 9:
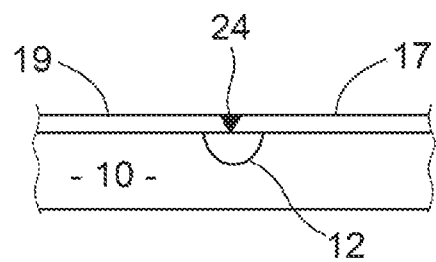
FIG. 9 is a schematic view of a structure bearing two panels welded edge-to-edge according to the first embodiment of the invention.
Figure 10:
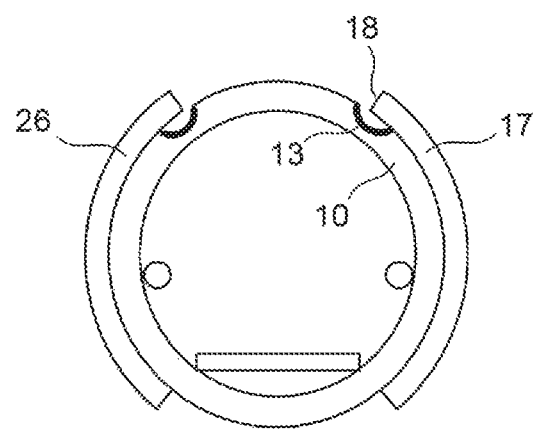
FIG. 10 is a sectional view schematically showing a fuselage comprising a frame bearing two lateral panels according to the first embodiment of the invention.
Figure 11:
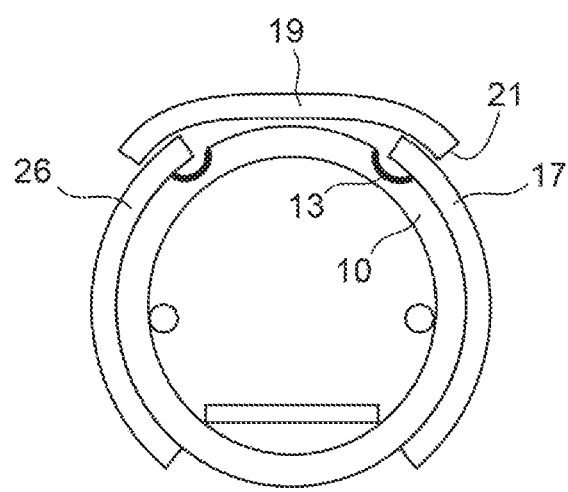
FIG. 11 is a sectional view schematically showing a fuselage comprising two lateral panels and receiving an upper panel according to the first embodiment of the invention.
Figure 12:
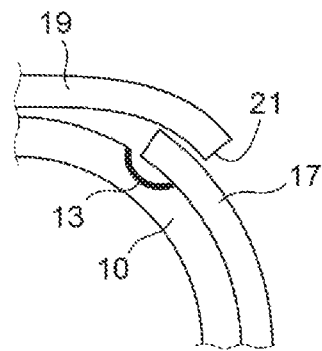
FIG. 12 is a detail sectional view showing the overlap of an upper panel and of a lateral panel before cutting the connection edges according to the first embodiment of the invention.
Figure 13:
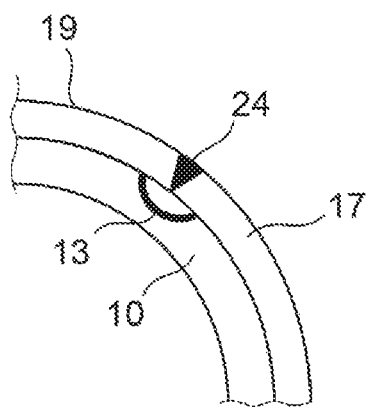
FIG. 13 is a detail view showing the connection of an upper panel to a lateral panel after the friction stir welding operation according to the first embodiment of the invention.

Once the welding seam has been formed, the reflective chute 13 is removed, for example by pulling it longitudinally such that it slides in the notches supporting it in order to be extracted, such that the operation is entirely completed, as illustrated in FIG. 9.

FIGS. 10 to 13 schematically illustrate the addition of an upper panel 19 and the connection thereof to a fuselage including frames provided with two reflective chutes and bearing two lateral panels 17 and 26. As shown by these figures, each lateral panel 17, 26 includes an upper raw edge which partially covers a chute.

Complementarily, the upper panel 19 is added to the frames, being positioned such that the raw edges thereof cover the raw edges of the lateral panels. The cuts are then produced in order to form the connection edges of the upper panel 19 with the lateral panel 17, and with the other lateral panel 26. The welding joints like the joint 24 can then be produced in order to complete the connection of the upper panel 19 to the lateral panels.

In the example of FIGS. 1 to 13, the invention is implemented by positioning the panels with respect to another, fixing them directly to the bearing structure thereof formed by the frames.

However, it is also possible to position the panels with tools or units for positioning or handling in order to place the raw edges thereof in an overlapping configuration upon one another, in order to carry out the laser cutting of the edges thereof and then carry out the friction stir connection thereof, to then attach all or part of the bearing structure on the already assembled panels.

Figure 14:
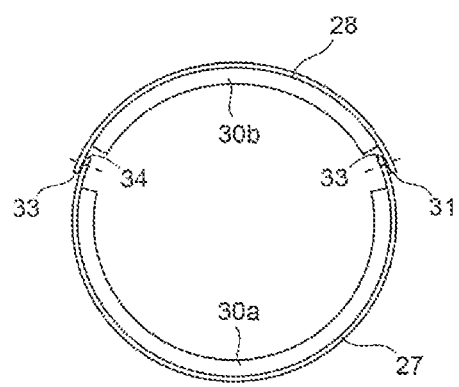
FIG. 14 is a sectional view schematically showing a fuselage portion comprising receiving an upper panel according to a second embodiment of the invention.
Figure 15:
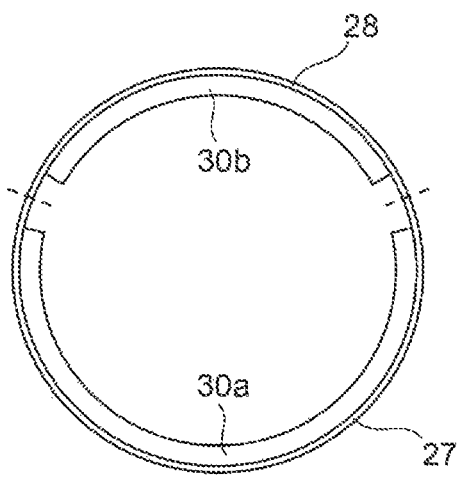
FIG. 15 is a detail sectional view showing the fuselage portion and the upper panel after cutting the connection edges according to the second embodiment of the invention.
Figure 16:
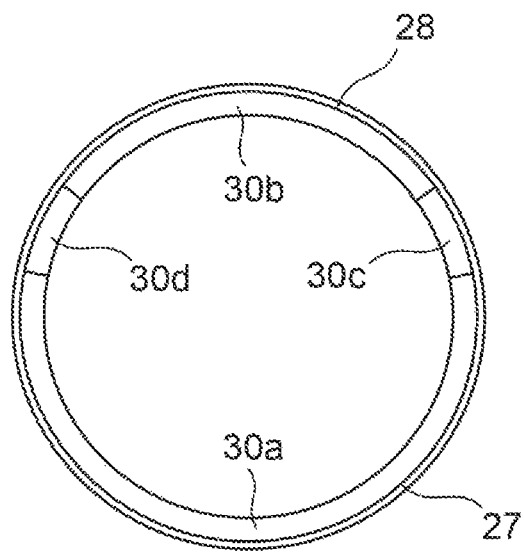
FIG. 16 is a detail view showing the upper panel connected to the rest of the fuselage in accordance with the second embodiment of the invention.

In this variant illustrated in FIGS. 14 to 16, a first lower panel 27 is fitted and connected to a second upper panel 28 in order to form the fuselage. A first frame portion 30a has already been fixed to an internal face of the lower panel 27, and similarly a second frame portion 30b has been fixed to an internal face of the upper panel 28.

The lower assembly, comprising the first panel 27 and the first frame portion 30a, is borne by a mounting of the apparatus, being located at a precise position. The upper assembly, comprising the second panel 28 and the second frame portion 30b, is for its part, borne by a movable handling and positioning unit, of the type mentioned in the patent document EP2853495.

Just as in the embodiment of FIGS. 3 to 13, the lower panel 27 has two raw edges 31, 32 at the ends thereof, and the upper panel 28 also has two raw edges 33, 34 at the ends thereof. The upper panel is positioned by the movable unit bearing it such that the raw edges thereof overlap or partially cover the raw edges of the lower panel 27.

Once everything is in place, i.e., when the upper assembly assumes a position that is geometrically compliant with respect to the lower assembly, cutting can be carried out, firstly along the overlap area of the raw edges 31 and 33, and secondly along the overlap area of the raw edges 32 and 34.

This precise cutting, of water jet laser type or the like, thus makes it possible to form two contiguous connection edges of the upper panel and of the lower panel, respectively, at the left-hand side of the arrangement, and two other contiguous edges of the upper panel and of the lower panel, respectively, at the right-hand side of the arrangement in the figures.

At this stage, which corresponds to the scenario of FIG. 15, the connection edges are contiguous, and the frame portions 30a and 30b have the ends thereof spaced apart from one another at the connection edges. It is then possible to implement the friction stir welding operation in order to connect firstly the connection edges of the left-hand side of the arrangement, and secondly the connection edges of the right-hand side.

When the welding operations are finished, the spaces between the ends of the frame portions 30a and 30b are closed by two joint bars 30c and 30d represented in FIG. 16. These joint bars 30c and 30d are welded to the ends of frame portions that they connect such as to form therewith closed circular frames 30 making it possible to form the bearing structure of the skin of the fuselage.

Generally, the panels to which the invention relates can be fuselage, wing unit, or tail unit panels, or indeed panels which are part of a tank or of a casing for landing gear, or any other type of panel. In practice, the invention is used for the edge-to-edge assembly of any thin piece that can be brought to temporarily overlap another.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for edge-to-edge welding of a first sheet metal panel to a second sheet metal panel, this method comprising:

positioning the first sheet metal panel;
positioning the second sheet metal panel with the second sheet metal panel overlapping a raw edge of the first sheet metal panel to form an overlap area of the first and second sheet metal panels;
jointly cutting the first sheet metal panel and the second sheet metal panel in the overlap area in order to form a connection edge of the first sheet metal panel and a connection edge of the second sheet metal panel;
friction stir welding the connection edges to edge-to-edge weld the first sheet metal panel to the second sheet metal panel;
wherein the cutting step is implemented using a laser cutting method; and
wherein a reflective chute is fitted under the overlap area of the first and second sheet metal panels to form a protection during the laser cutting step.

2. The method according to claim 1,
wherein the first sheet metal panel is positioned by being fixed to a bearing structure, and
wherein the second sheet metal panel is positioned by being fixed to this bearing structure.

3. The method according to claim 1,
wherein the first sheet metal panel is positioned on a mounting of an apparatus, and
wherein the second sheet metal panel is positioned with respect to the first sheet metal panel by being borne by a handling unit.

4. The method according to claim 1, wherein the cutting step is implemented using a laser water jet cutting method.

5. The method according to claim 1, wherein the cutting step produces a cut having a width less than three tenths of a millimeter.

6. The method according to claim 1, wherein the reflective chute is dimensioned to collect scrap cuttings from the first sheet metal panel at an end of the cutting step.

7. The method according to claim 2, wherein the bearing structure includes frames, each comprising a notch receiving the reflective chute.

8. The method according to claim 7, wherein the first and second sheet metal panels are incurved and wherein the frames bearing the first and second sheet metal panels are curved.

* * * * *